R. W. Pitman,

Insect Trap,

N° 62,563.  Patented Mar. 5, 1867.

Witnesses:
H. H. Young
H. J. Chapman

Inventor.
Richard W. Pittman.
By David A. Burr
atty.

United States Patent Office.

RICHARD W. PITMAN, OF WEST POINT, IOWA.

*Letters Patent No. 62,563, dated March 5, 1867.*

---

IMPROVEMENT IN INSECT TRAP LANTERN.

---

The Schedule referred to in these Letters Patent and making part of the same.

---

TO ALL WHOM IT MAY CONCERN:

Be it known that I, RICHARD W. PITMAN, of West Point, in the county of Lee, and State of Iowa, have invented a new and useful Insect Trap and Lantern; and I do hereby declare that the following is a full and exact description thereof, reference being had to the accompanying drawings, forming a part of this specification, in which—

Figure 1:
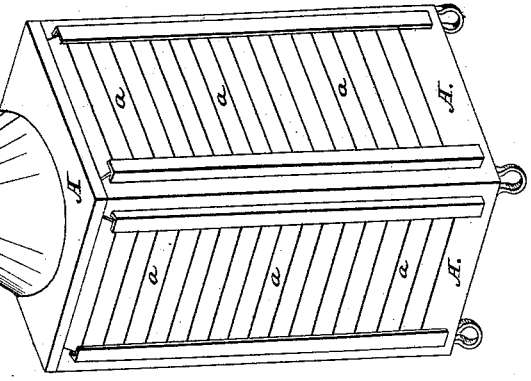

Figure 1 is a perspective view of my improved trap; and

Figure 2:
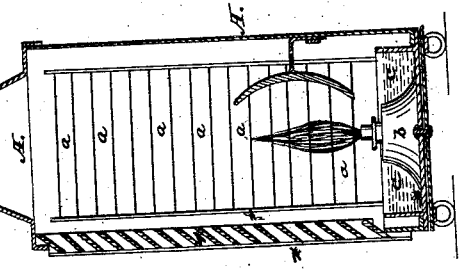

Figure 2, a central vertical section thereof.

Similar letters indicate like parts in each of the figures.

The nature of my invention consists in so constructing a lantern with open sides, as that the light from a lamp therein shall attract insects and entice them to pass in through these open sides to their destruction by the flame, and by water in a channel surrounding the lamp. The invention is more especially designed as a trap for the moths which infest bee-hives.

My improved trap is constructed of a frame, A, similar to that used ordinarily in flat-sided lanterns, and in substantially the same manner, and may be square or otherwise polygonal in form. In the slides, wherein glasses are usually inserted, I place slides constructed of stationary slats, $a$, (which I prefer to make of tin or other bright metal,) placed horizontally parallel to each other, at a downward inclination of about fifty degrees, so that the lower edge of each slat $a$ shall fall below a horizontal plane extended from the upper edge of the next slat below, and thus break the course of a direct current of air, and protect the light from extinguishment thereby. Sufficient space is left between each slat to admit of the ready passage into the trap of moths and other insects alighting thereon. A lamp, $b$, or candlestick, surrounded by a water-tight compartment, $c$, forms the bottom of the apparatus, and is secured therein in any suitable manner. When the apparatus, so constructed, is hung up in front of the bee-hives, having its lamp lighted and the space surrounding the same filled with water, the moths approaching the hives will be at once attracted by the light and fly upon the open slats of the trap, and passing up to the upper edge will fly thence to the light, and so soon as singed thereby will drop into the water below. The outward inclination of the slats presents an obstruction to their egress.

The trap so constructed may be used as an ordinary lantern during the winter season by substituting glass slides for the open slats. This is simply done by withdrawing the one and inserting the other. I contemplate applying an outer casing of slats, as described, to a closed glass lantern, leaving a sufficient space between the slats and the glass to allow the insects to fall into a closed channel or vessel of water or other liquid at the bottom of the slats encircling the lantern. The reflection of light from the bright surface of the slats presents greater attraction to the insects than a simple light. The back part or one of the sides of the lantern may be left closed or solid, as shown in fig. 2 of the drawings, to afford protection to the light from wind coming from any given quarter. Although this trap is specially adapted to the protection of bee-hives from bee-moths, it may be used for insects infesting fruit trees and shrubbery.

Having thus fully described my invention, what I claim therein as new, and desire to secure by Letters Patent, is—

An insect trap, composed of a framework of slats encircling a light, and constructed substantially in the manner and for the purpose herein set forth.

I claim also the combination of a water receptacle with the slatted framework encircling a light, substantially in the manner and for the purpose herein set forth.

The foregoing description of my improved insect trap and lantern signed by me this 12th day of December A. D. 1866.

R. W. PITMAN

In the presence of—
DAVID A. BURR,
H. H. YOUNG.